United States Patent
Yang et al.

(10) Patent No.: US 9,386,565 B2
(45) Date of Patent: *Jul. 5, 2016

(54) METHOD FOR TRANSMITTING CONTROL INFORMATION AND DEVICE FOR SAME

(75) Inventors: Suckchel Yang, Anyang (KR); Joonkui Ahn, Anyang (KR); Dongyoun Seo, Anyang (KR); Mingyu Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 14/000,859

(22) PCT Filed: May 17, 2012

(86) PCT No.: PCT/KR2012/003909
§ 371 (c)(1),
(2), (4) Date: Aug. 21, 2013

(87) PCT Pub. No.: WO2012/157981
PCT Pub. Date: Nov. 22, 2012

(65) Prior Publication Data
US 2013/0329688 A1    Dec. 12, 2013

Related U.S. Application Data

(60) Provisional application No. 61/486,822, filed on May 17, 2011.

(51) Int. Cl.
*H04W 72/04* (2009.01)
*H04L 1/18* (2006.01)
(Continued)

(52) U.S. Cl.
CPC ......... *H04W 72/0406* (2013.01); *H04L 1/1822* (2013.01); *H04L 1/1861* (2013.01);
(Continued)

(58) Field of Classification Search
None
See application file for complete search history.

(56) References Cited

U.S. PATENT DOCUMENTS

2011/0243039 A1  10/2011  Papasakellariou et al.
2011/0243066 A1  10/2011  Nayeb et al.
(Continued)

FOREIGN PATENT DOCUMENTS

CN   101689984   3/2010
JP   2010-521942  6/2010
(Continued)

OTHER PUBLICATIONS

3rd Generation Partnership Project (3GPP) TS 36.211 V9.1.0 (release 9) Evolved Universal Terrestrial Radio Access (E-UTRA); Physical channels and modulation. Available Mar. 30, 2010. pp. 10-11.*

(Continued)

*Primary Examiner* — Jeffrey M Rutkowski
*Assistant Examiner* — Andre Tacdiran
(74) *Attorney, Agent, or Firm* — Lee, Hong, Degerman, Kang & Walmey; Jonathan Kang; Michael Monaco

(57) ABSTRACT

The present invention relates to a wireless communication system. In more detail, the present invention relates to a method for transmitting uplink control information in a wireless communication system operating as TDD, and a device for same. The method includes transmitting Hybrid Automatic Repeat request—Acknowledgement (HARQ) in a subframe n through Physical Uplink Control Channel (PUCCH), and a transmission power of the PUCCH relates to a method determined using Equation 4 or 5, and a device for same.

10 Claims, 16 Drawing Sheets

(51) Int. Cl.
*H04W 52/32* (2009.01)
*H04L 5/00* (2006.01)
*H04W 52/24* (2009.01)
*H04W 52/40* (2009.01)

(52) U.S. Cl.
CPC .......... *H04W52/325* (2013.01); *H04L 1/1812* (2013.01); *H04L 5/0053* (2013.01); *H04W 52/242* (2013.01); *H04W 52/40* (2013.01)

(56) References Cited

U.S. PATENT DOCUMENTS

| | | |
|---|---|---|
| 2011/0243278 A1 | 10/2011 | Cheng |
| 2012/0033648 A1 | 2/2012 | Papasakellariou et al. |
| 2012/0034927 A1 | 2/2012 | Papasakellariou et al. |
| 2012/0106407 A1* | 5/2012 | Papasakellariou et al. ... 370/280 |
| 2012/0106569 A1 | 5/2012 | Che et al. |
| 2012/0170683 A1 | 7/2012 | Frederiksen et al. |
| 2012/0269103 A1 | 10/2012 | Papasakellariou et al. |

FOREIGN PATENT DOCUMENTS

| | | |
|---|---|---|
| JP | 2011-526454 | 10/2011 |
| WO | 2010/006903 | 1/2010 |

OTHER PUBLICATIONS

3rd Generation Partnership Project (3GPP), "Technical Specification Group Radio Access Network; Evolved Universal 1 Terrestrial Radio Access (E-UTRA); Physical layer procedures (Release 10)," 3GPP TS 36.213 VI0.I.0, Mar. 2011, D 115 pages (relevant portions: sections 5 and 10).*
Zte, et al., "CR on power control for HARQ-ACK transmission on PUCCH," 3GPP TSG-RAN WG1 Meeting #65, R1-111994, May 2011, 4 pages.
Zte, "On ACK/NACK bundling in LTE-A TDD," 3GPP TSG RAN WG1 Meeting #62bis, R1-105454, Oct. 2010, 6 pages.
Samsung, "DAI design for TDD," 3GPP TSG RAN WG1 #62bis, R1-105361, Oct. 2010, 3 pages.
ASUSTeK, "DRX retransmission missing for TDD," 3GPP TSG-RAN2 Meeting #68is, R2-100226, Jan. 2010, 4 pages.
European Patent Office Application Serial No. 12786115.1, Search Report dated Oct. 16, 2014, 9 pages.
PCT International Application No. PCT/KR2012/003909, Written Opinion of the International Searching Authority dated Nov. 26, 2012, 13 pages.
Zte, et al., "CR on power control for HARQ-ACK transmission on PUCCH," 3GPP TSG-RAN WG1 Meeting #65, R1-111886, May 2011, 4 pages.
Zte, et al., "CR on power control for HARQ-ACK transmission on PUCCH," 3GPP TSG-RAN WG1 Meeting #65, R1-112009, May 2011, 4 pages.
3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.1.0, Mar. 2011, 115 pages (relevant portions: sections 5 and 10).
CATT, "Remaining issue on PUCCH power control in LTE-A," 3GPP TSG RAN WG1 Meeting #65, R1-111361, May 2011, 10 pages (relevant portions: sections 1-3).
Samsung, "PUCCH Transmission Power with HARQ-ACK Bundling and for TDD," 3GPP TSG RAN WG1 #64, R1-110724, Feb. 2011, 2 pages.
PCT International Application No. PCT/KR2012/003909, Written Opinion of the International Searching Authority dated Nov. 26, 2012, 10 pages.
3rd Generation Partnership Project (3GPP), "Technical Specification Group Radio Access Network; Evolved Universal Terrestrial Radio Access (E-UTRA); Physical layer procedures (Release 9)," 3GPP TS 36.213 V9.1.0, Mar. 2010, 79 pages.
United States Patent and Trademark Office U.S. Appl. No. 14/446,576, Office Action dated Jun. 18, 2015, 16 pages.
LG Electronics, "Draft CR for correction on nHARQ equation for TDD with PUCCH format 3", R1-112324, 3GPP TSG-RAN WG1 Meeting #66, Aug. 2011, 3 pages.
The State Intellectual Property Office of the People's Republic of China Application Serial No. 201280019793.0 Office Action dated Sep. 2, 2015, 7 pages.

* cited by examiner

Reuse of LTE PUCCH format 2 structure (normal CP case)

* $P_{PUCCH}(i)$ is determined by using the following equation $$n_{HARQ} = \sum_{c=0}^{C-1} \left( (V_{DAI,c}^{DL} - U_{DAI,c}) \cdot n_c^{ACK} + \sum_{k \in K} N_{k,c}^{received} \right)$$

* $P_{PUCCH}(i)$ is determined by using the following equation $$n_{HARQ} = \sum_{c=0}^{C-1} \left( ((V_{DAI,c}^{DL} - U_{DAI,c}) \bmod 4) \cdot n_c^{ACK} + \sum_{k \in K} N_{k,c}^{received} \right)$$

METHOD FOR TRANSMITTING CONTROL INFORMATION AND DEVICE FOR SAME

CROSS-REFERENCE TO RELATED APPLICATIONS

This application is the National Stage filing under 35 U.S.C. 371 of International Application No. PCT/KR2012/003909, filed on May 17, 2012, which claims the benefit of U.S. Provisional Application Ser. No. 61/486,822, filed on May 17, 2011, the contents of which are all hereby incorporated by reference herein in their entirety.

TECHNICAL FIELD

The present invention relates to a wireless communication system, and more specifically, to a method for transmitting control information and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Object

An object of the present invention devised to solve the problem lies in a method for efficiently transmitting control information in a wireless communication system and a device for the same. Another object of the present invention is to provide a method for efficiently transmitting uplink control information in a TDD (Time Division Duplex) system and efficiently managing resources for the same and a device for the same. The technical problems solved by the present invention are not limited to the above technical problems and those skilled in the art may understand other technical problems from the following description.

Technical Solution

In an aspect of the present invention, provided herein is a method for transmitting uplink control information in a TDD (Time Division Duplex) wireless communication system, the method comprising: transmitting HARQ-ACK (Hybrid Automatic Repeat reQuest-Acknowledgement) via a PUCCH (Physical Uplink Control Channel) in a subframe n, wherein a transmission power of the PUCCH is determined by using the following equation:

$$n_{HARQ} = \sum_{c=0}^{C-1} \left( ((V_{DAI,c}^{DL} - U_{DAI,c}) \bmod 4) \cdot n_c^{ACK} + \sum_{k \in K} N_{k,c}^{received} \right),$$

wherein C denotes the number of configured cells, K denotes a set having M elements k (k∈K) according to UL-DL (Uplink-Downlink) configuration, M is a positive integer, $V_{DAI,c}^{DL}$ is a value indicated by a 2-bit DAI (Downlink Assignment Index) field included in a downlink scheduling-related PDCCH (Physical Downlink Control Channel) lastly detected within subframe(s) n−k in a serving cell c, $U_{DAI,c}$ denotes the total number of downlink scheduling-related PDCCHs detected within the subframe(s) n−k in the serving cell c, and $n_c^{ACK}$ denotes the number of HARQ-ACK bits corresponding to a configured downlink transmission mode on the serving cell c, and is set to 1 when spatial bundling is applied, when spatial bundling is applied, $N_{k,c}^{received}$ represents the number of PDCCH or PDSCH (Physical Downlink Shared Channel) without a corresponding PDCCH received in the subframe n−k and the serving cell c, when spatial bundling is not applied, $N_{k,c}^{received}$ represents the number of transport blocks received or SPS (Semi-Persistent Scheduling) release PDCCH received in the subframe n−k and the serving cell c, and mod represents a modulo operation.

In another aspect of the present invention, provided herein is a communication device configured to transmit uplink control information in a TDD wireless communication system, the communication device comprising a radio frequency (RF) unit and a processor, wherein the processor is configured to transmit HARQ-ACK (Hybrid Automatic Repeat reQuest-Acknowledgement) via a PUCCH (Physical Uplink Control Channel) in a subframe n, and wherein a transmission power of the PUCCH is determined by the following equation:

$$n_{HARQ} = \sum_{c=0}^{C-1} \left( ((V_{DAI,c}^{DL} - U_{DAI,c}) \bmod 4) \cdot n_c^{ACK} + \sum_{k \in K} N_{k,c}^{received} \right),$$

wherein C denotes the number of configured cells, K denotes a set having M elements k (k∈K) according to UL-DL configuration, M is a positive integer, $V_{DAI,c}^{DL}$ is a value indicated by a 2-bit DAI (Downlink Assignment Index) field included in a downlink scheduling-related PDCCH lastly detected within subframe(s) n−k in a serving cell c, $U_{DAI,c}$ denotes the total number of downlink scheduling-related PDCCHs detected within the subframe(s) n−k in the serving cell c, $n_c^{ACK}$ denotes the number of HARQ-ACK bits corresponding to a configured downlink transmission mode on the serving cell c, and is set to 1 when spatial bundling is applied, when spatial bundling is applied, $N_{k,c}^{received}$ represents the number of PDCCH or PDSCH without a corresponding PDCCH received in the subframe n−k and the serving cell c, when spatial bundling is not applied, $N_{k,c}^{received}$ represents the number of transport blocks or SPS (Semi-Persistent Scheduling) release PDCCH received in the subframe n−k and the serving cell c, and mod represents a modulo operation.

The transmission power for the PUCCH may be determined by using the following equation:

$$h(\cdot) = \frac{n_{HARQ} + n_{SR} - 1}{N},$$

wherein N is a positive integer, and $n_{SR}$ is used to adjust the transmission power for the PUCCH in relation to SR and is set to 0 or 1.

The transmission power for the PUCCH may be determined by using the following equation:

$$P_{PUCCH}(n) = \min\left\{\begin{array}{l} P_{CMAX,c}(n), \\ P_{0\_PUCCH} + PL_c + h(\cdot) + \Delta_{F\_PUCCH}(F) + \Delta_{TxD}(F') + g(i) \end{array}\right\},$$

wherein $P_{PUCCH}(n)$ represents the transmission power for the PUCCH, $P_{CMAX,c}(n)$ represents a configured transmission power in the subframe n for the serving cell c, $P_{0\_PUCCH}$ is a parameter set by a higher layer, $PL_c$ is a downlink path loss estimate of the serving cell c, $\Delta_{F\_PUCCH}(F)$ represents a value corresponding to a PUCCH format, $\Delta_{TxD}(F')$ is a value set by a higher layer or 0, and g(i) represents a current PUCCH power control adjustment state.

The wireless communication system may operate in one of UL-DL configurations #1 to #6.

The wireless communication system may operate in UL-DL configuration #5.

Advantageous Effects

According to the present invention, control information can be efficiently transmitted in a wireless communication system. Specifically, uplink control information can be efficiently transmitted in a TDD system and resources for the same can be efficiently managed.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
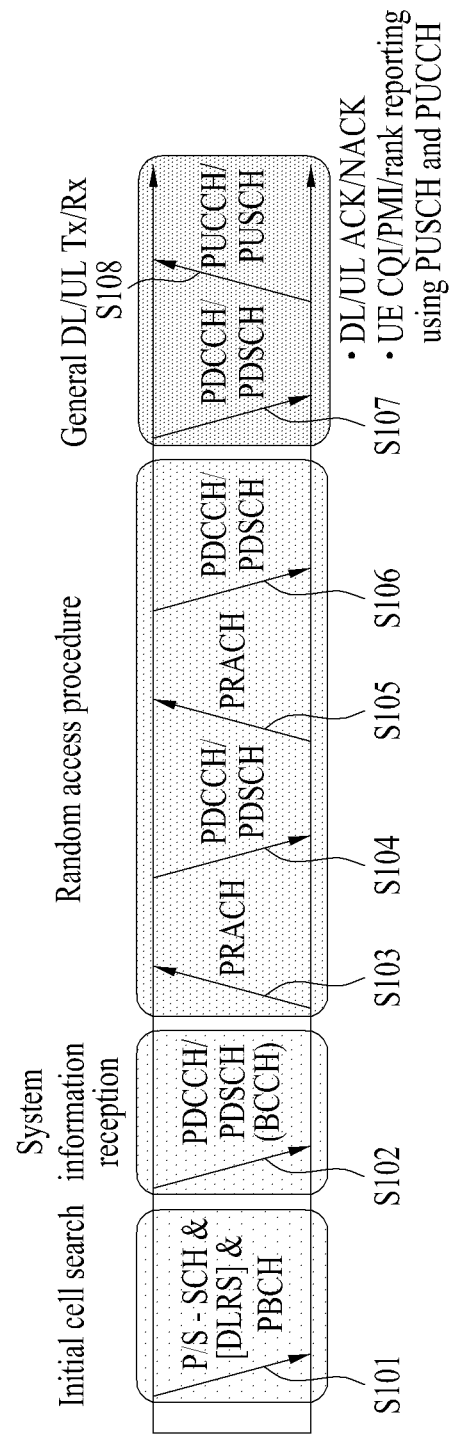
FIG. 1 illustrates physical channels used in a 3GPP LTE system and a signal transmission method using the same.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

The terms used in the specification are described.

HARQ-ACK (Hybrid Automatic Repeat request-Acknowledgement): this represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, NACK, DTX or NACK/DTX. HARQ-ACK for a specific CC or HARQ-ACK of a specific CC refers to an ACK/NACK response to a downlink signal (e.g. PDSCH) related to (e.g. scheduled for) the corresponding CC. A PDSCH can be replaced by a transport block (TB) or a codeword.

PDSCH: this corresponds to a DL grant PDCCH. The PDSCH is used interchangeably with a PDSCH w/PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

DAI (Downlink Assignment Index): this is included in DCI transmitted via a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

CA based system: this refers to a wireless communication system capable of aggregating a plurality of component carriers (or cells). The CA based communication system can use only a single component carrier (or cell) or aggregate a plurality of component carriers (or cells) and use the aggregated component carriers according to configuration. The number of aggregated component carriers (or cells) can be independently determined for each UE.

CC (or cell) scheduling PDCCH: this refers to a PDCCH that schedules a corresponding CC (or cell). For example, the CC scheduling PDCCH includes a PDCCH corresponding to a PDSCH on the corresponding CC (cell) and an SPS release PDCCH.

Cross-CC scheduling: this refers to an operation of transmitting a PDCCH that schedules CC #a (or cell #a) through CC #b (or cell #b) different from CC #a (or cell #a).

Non-cross-CC scheduling: this refers to an operation of transmitting a PDCCH that schedules each CC (or each cell) through the corresponding CC (or corresponding cell).

The following terms are used equivalently in the specification.

Serving cell (ServCell)=component carrier (CC)
PCell (primary cell)=cell (or CC) on which ACK/NACK (or HARQ-ACK) is transmitted
PUCCH format 3=E-PUCCH format
Configured cell=cell (or CC) allocated through RRC In a wireless communication system, a UE receives information from a BS through downlink (DL) and transmits information to the BS through uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE is synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indicator (RI), etc. In the specifically, HARQ ACK/NACK is simply referred to as HARQ-ACK or ACK/NACK(A/N). HARQ-ACK includes at least one of positive ACK (simply, ACK), negative ACK (NACK), DTX and NACK/DTX. While the UCI is transmitted through a PUCCH in general, it may be transmitted via a PUSCH when control information and traffic data need to be simultaneously transmitted. The UCI may be aperiodically transmitted via a PUSCH at the request/instruction of a network.

Figure 2:
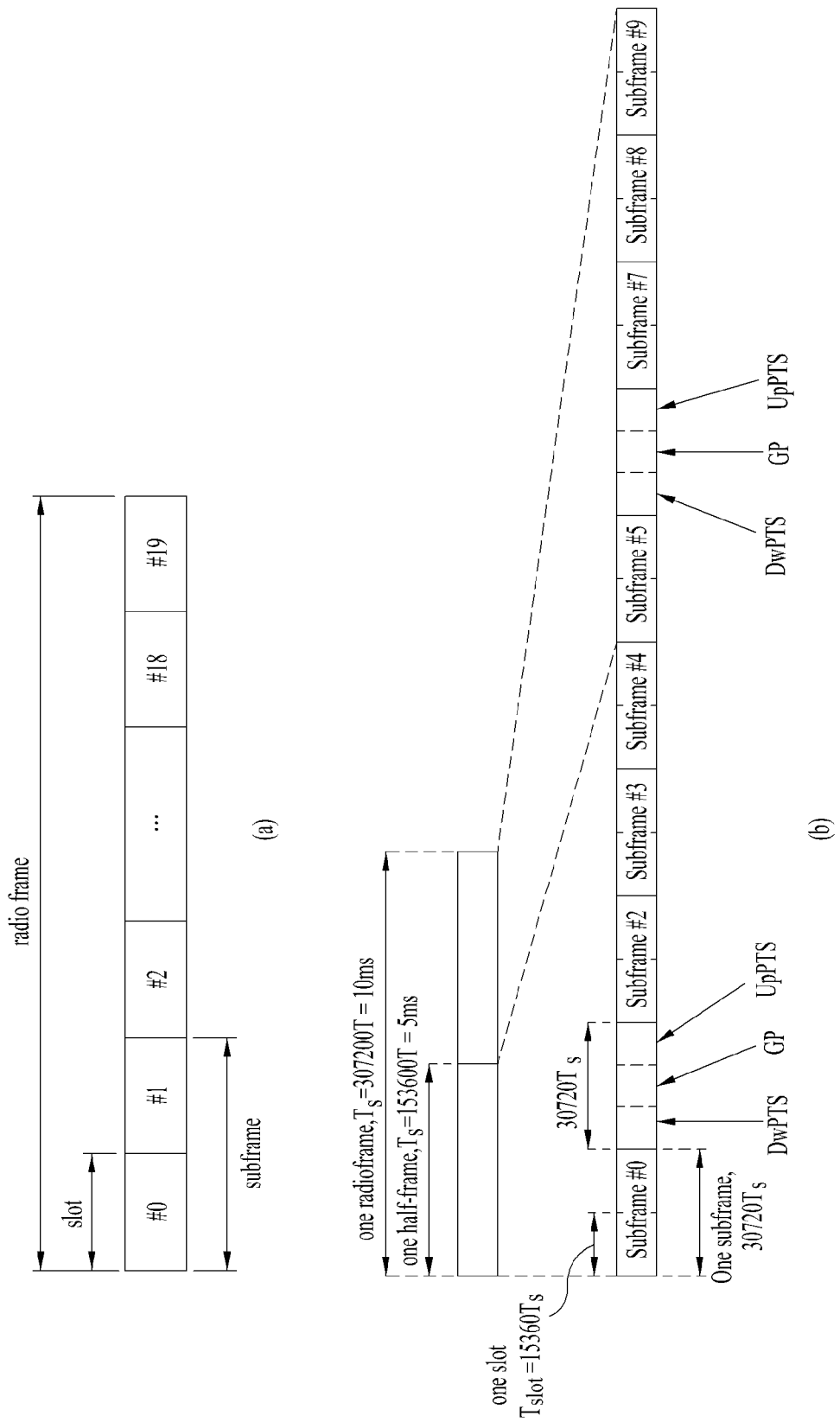
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

The radio frame structure is merely exemplary and the number of subframes included in the radio frame, the number of slots included in a subframe, and the number of symbols included in a slot can be vary.

Figure 3:
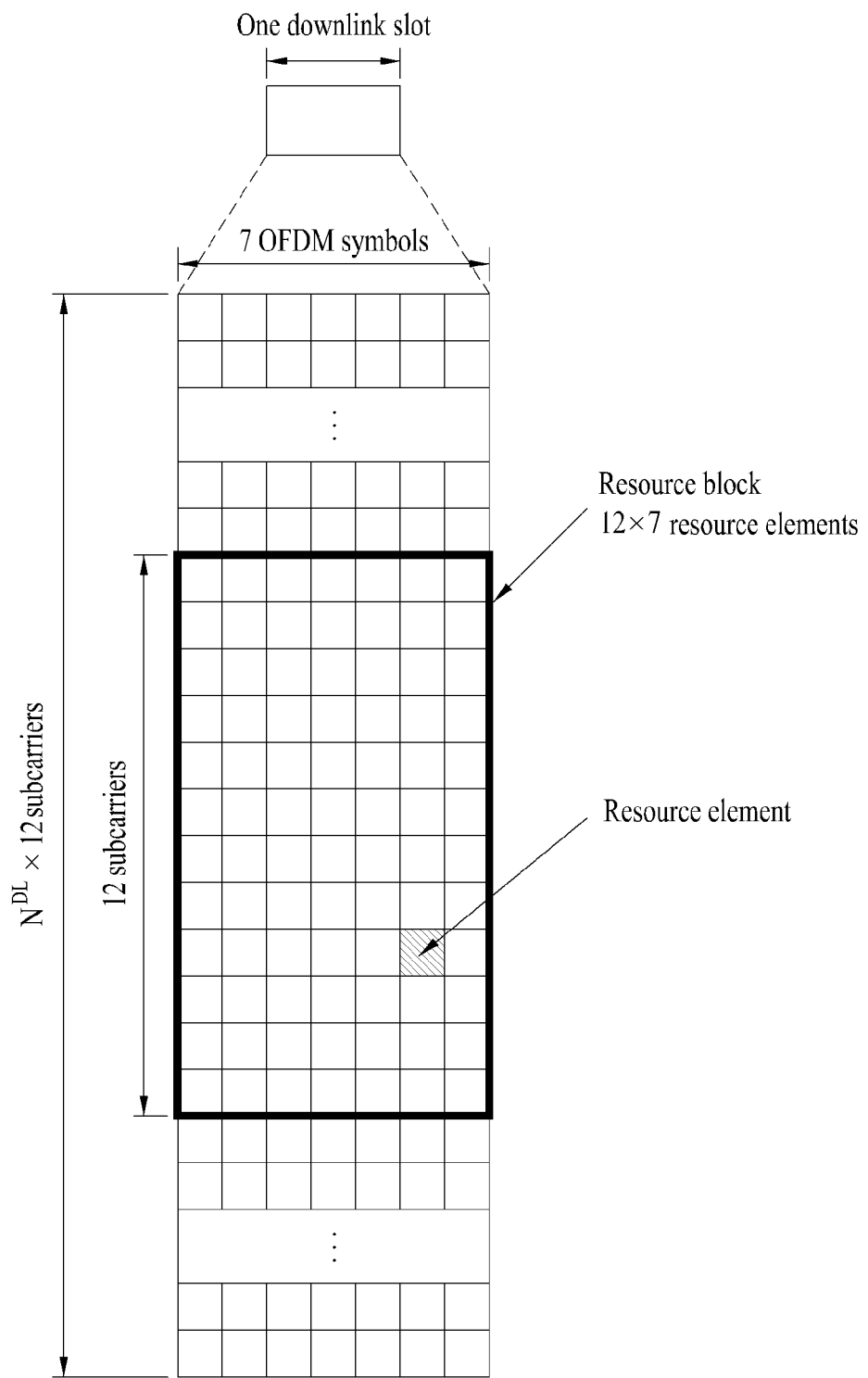
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
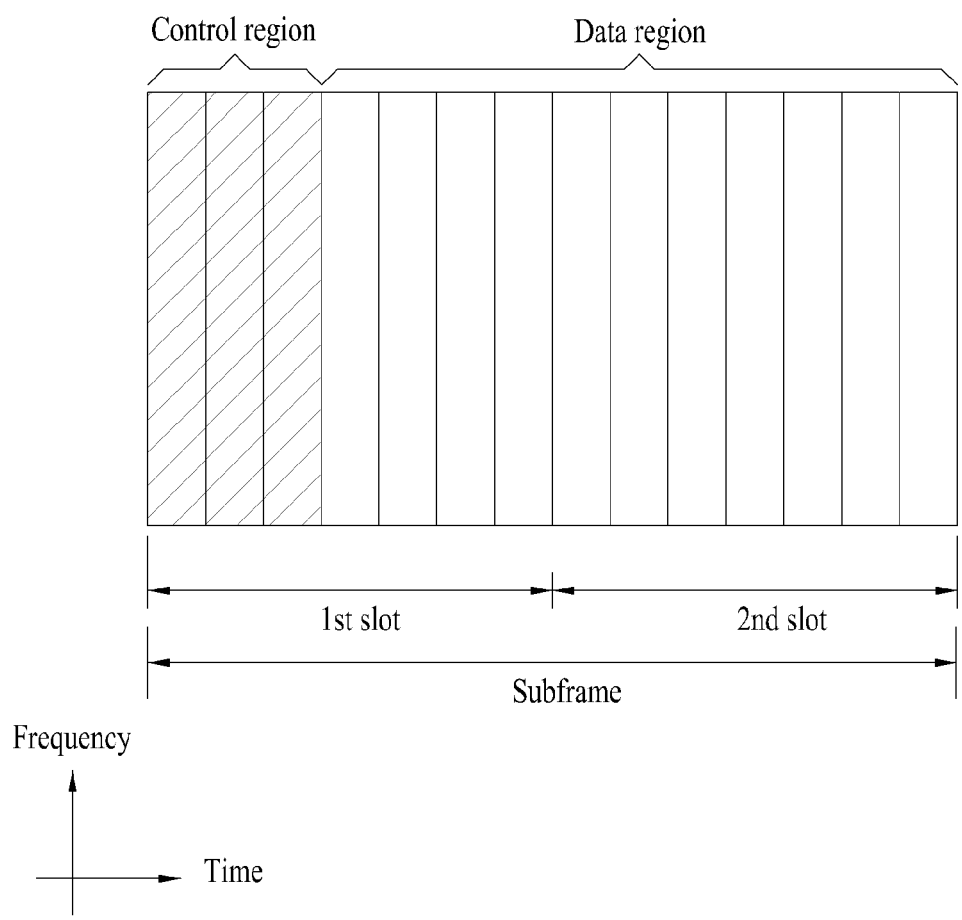
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted via the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
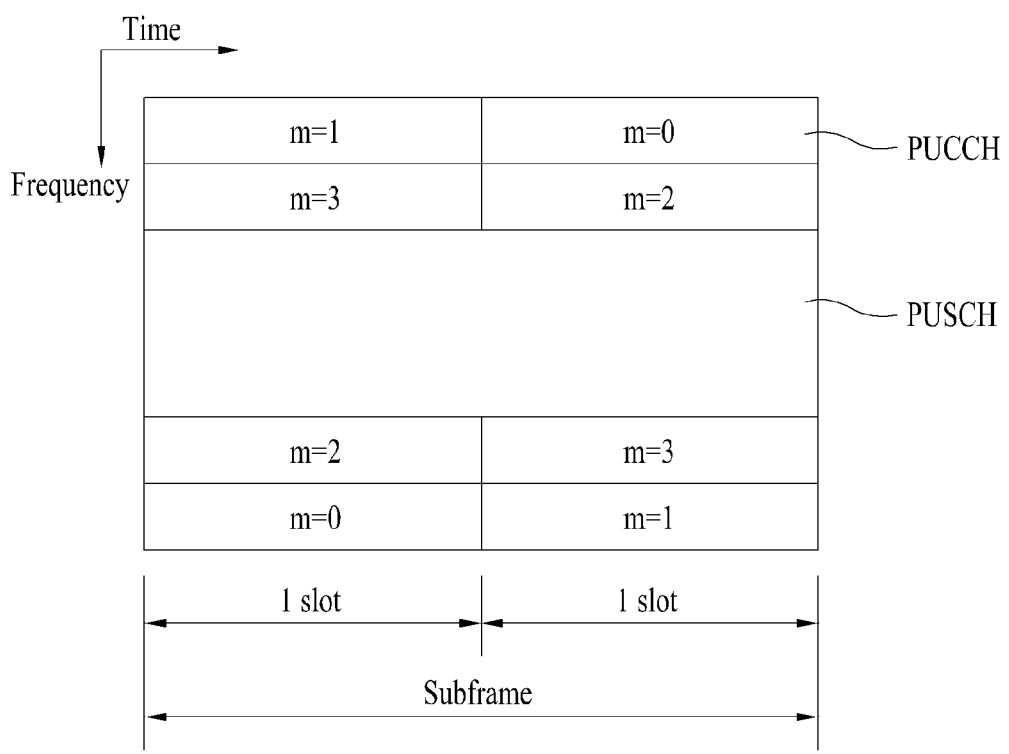
FIG. 5 illustrates an uplink subframe structure.

FIG. 5 illustrates an uplink subframe structure.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 2 shows the mapping relationship between PUCCH formats and UCI in LTE.

TABLE 2

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK (+ SR) (48 bits) |

Since an LTE UE cannot simultaneously transmit a PUCCH and a PUSCH, UCI (e.g. CQI/PMI, HARQ-ACK, RI, etc.) is multiplexed in a PUSCH region when the UCI needs to be transmitted through a subframe in which a PUSCH is transmitted. For example, when HARQ-ACK needs to be transmitted in a subframe allocated for PUSCH transmission, the UE multiplexes UL-SCH data and the HARQ-ACK prior to DFT-spreading, and then transmits control information and data via a PUSCH.

A procedure for transmitting ACK/NACK in a TDD system will now be described. TDD divides a frequency band into DL subframes and UL subframes in the time domain to use the frequency band (refer to FIG. 2(b)). Accordingly, a larger number of DL subframes or a larger number of UL subframe may be allocated in a DL/UL asymmetrical data traffic situation, and thus DL subframes may not one-to-one correspond to UL subframes in TDD. Particularly, when the number of DL subframes is larger than the number of UL subframes, the UE may need to transmit ACK/NACK responses to a plurality of PUSCHs (and/or PDCCHs which require ACK/NACK responses) on a plurality of DL subframes through one single UL subframe. For example, the ratio of the number of DL subframes to the number of UL subframes can be set as M:1 according to TDD configuration. Here, M denotes the number of DL subframes corresponding to one UL subframe. In this case, the UE needs to transmit ACK/NACK responses to a plurality of PDSCHs (or PDCCHs which require ACK/NACK responses) on M DL subframes through one UL subframe.

Figure 6:
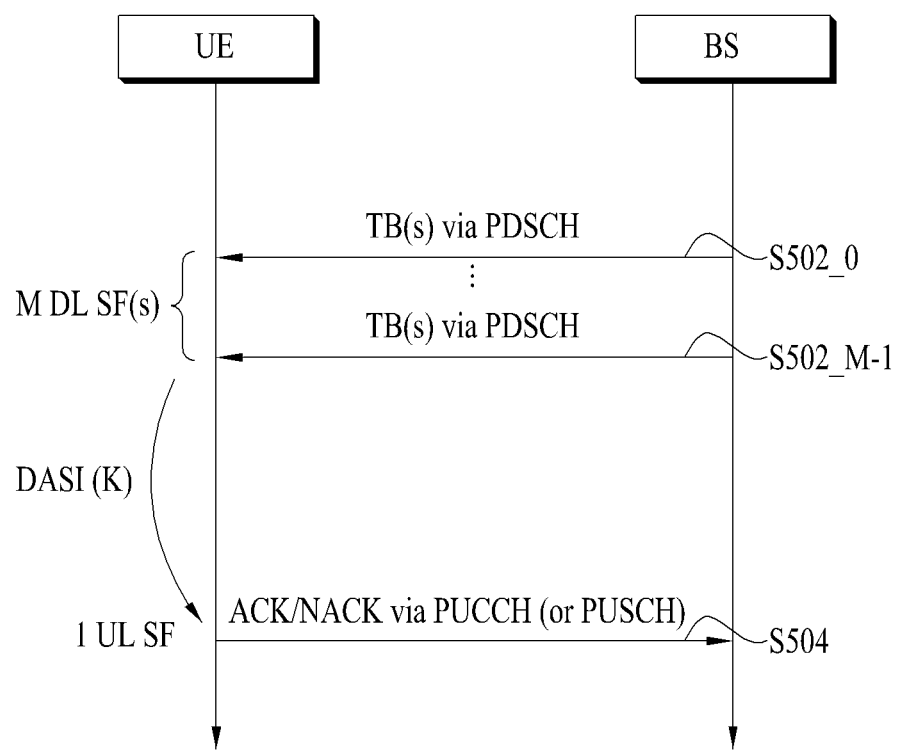
FIG. 6 illustrates a procedure for transmitting TDD UL ACK/NACK (Uplink Acknowledgement/Negative Acknowledgement) in a single cell situation.

FIG. 6 illustrates a procedure for transmitting TDD UL ACK/NACK.

Referring to FIG. 6, a UE can receive one or more PDSCH signals in M DL subframes (SFs) ($S502\_0$ to $S502\_M-1$). Each PDSCH signal is used to transmit one or more (e.g. 2) transport blocks (TBs) (or codewords) according to transmission mode. A PDCCH signal requiring an ACK/NACK response, for example, a PDCCH signal indicating (downlink) SPS (Semi-Persistent Scheduling) (simply, SPS release PDCCH signal) may also be received in step $S502\_0$ to $S502\_M-1$, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step $S502\_0$ to $S502\_M-1$. While ACK/NACK is transmitted via a PUCCH basically, ACK/NACK is transmitted via a PUSCH when a PUSCH is transmitted at ACK/NACK transmission time. Various PUCCH formats shown in Table 2 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 3 shows DASI (K: {k0, k1, . . . , k−1}) defined in LTE(-A). Table 3 shows spacing between a UL subframe transmitting ACK/NACK and a DL subframe relating to the UL subframe. Specifically, when a PDCCH that indicates PDSCH transmission and/or (downlink) SPS release is present in a subframe n−k (k∈K), the UE transmits ACK/NACK in a subframe n.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When the UE transmits an ACK/NACK signal in TDD, the following problem may be encountered.

When the UE misses part of PDCCHs transmitted from a BS during several subframes periods, the UE cannot be aware that a PDSCH corresponding to a missed PDCCH has been transmitted thereto, and thus an error can be generated during generation of ACK/NACK.

To prevent this error, a TDD system includes a DAI (Downlink Assignment Index) in a PDCCH. The DAI represents an accumulation value (i.e. counted value) of PDCCH(s) corresponding to PDSCH(s) and PDCCHs) indicating (downlink) SPS release up to the current subframe within DL subframes(s) n−k (k∈K). For example, when 3 DL subframes correspond to a UL subframe, downlink scheduling-related PDCCHs (e.g. a PDCCH corresponding to a PDSCH, and a downlink SPS release PDCCH) transmitted in the 3 DL subframes are sequentially indexed (i.e. sequentially counted) and carried on a PDSCH-scheduling PDCCH. The UE can be aware of whether previous PDCCHs have been successfully received using DAI information included in a PDCCH. A DAI included in the PDSCH-scheduling PDCCH and (downlink) SPS release PDCCH is referred to as a DL DAI, DAI-c (counter), or simply DAI.

Table 4 shows a value $V_{DAI}^{DL}$ indicated by a DL DAI field.

TABLE 4

| DAI<br>MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

* MSB: Most Significant Bit, LSB: Least Significant Bit

Figure 7:
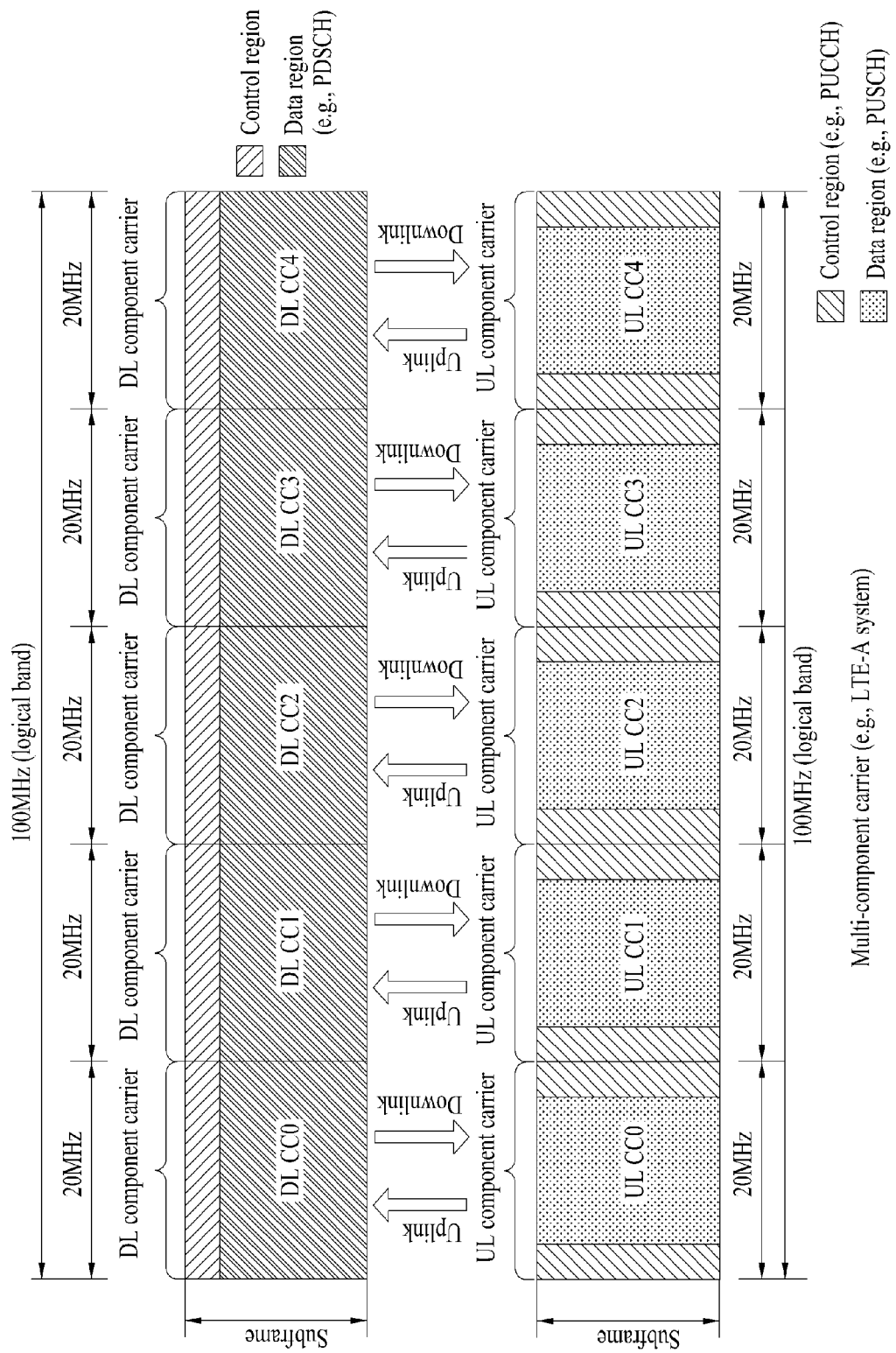
FIG. 7 illustrates a carrier aggregation (CA) communication system.

FIG. 7 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 7, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only via the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 8:
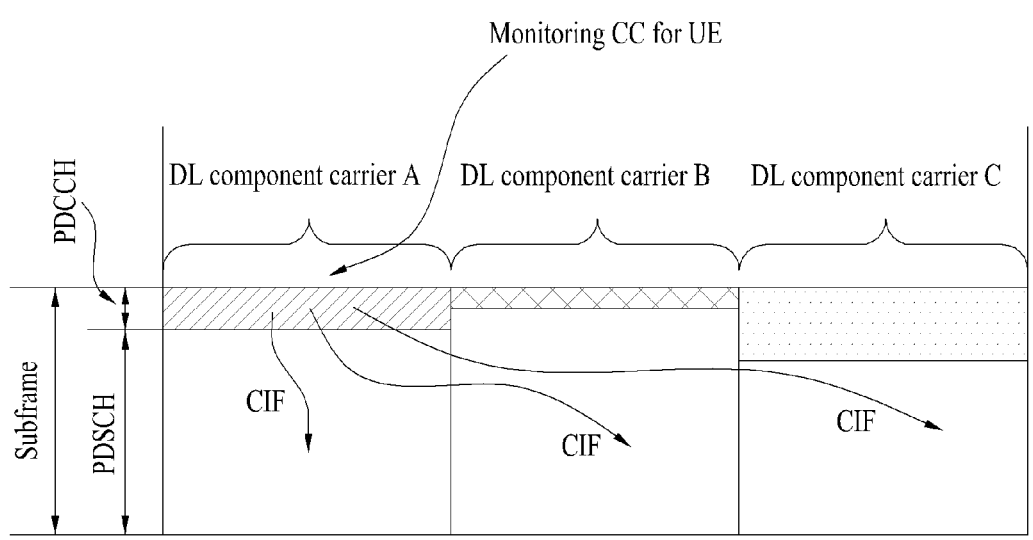
FIG. 8 illustrates cross-carrier scheduling.

FIG. 8 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

LTE-A allows cross-carrier scheduling for a DL PCC and allows only self-carrier scheduling for a DL SCC. In this case, a PDCCH that schedules a PDSCH on the DL PCC can be transmitted only on the DL PCC. On the other hand, a PDCCH that schedules a PDSCH on the DL SCC can be transmitted on the DL PCC (cross-carrier scheduling) or transmitted on the DL SCC (self-carrier scheduling).

ACK/NACK Transmission in CA Based TDD System

A new enhanced PUCCH format (E-PUCCH format) (i.e. PUCCH format 3) has been introduced for ACK/NACK transmission in a CA based TDD system. In case of FDD, the E-PUCCH format (i.e. PUCCH format 3) may be configured when a plurality of cells (or CCs) are configured for a corresponding UE. In case of TDD, the E-PUCCH format (i.e. PUCCH format 3) may be configured when one or more cells (or CCs) are configured for the corresponding UE.

Figure 9:
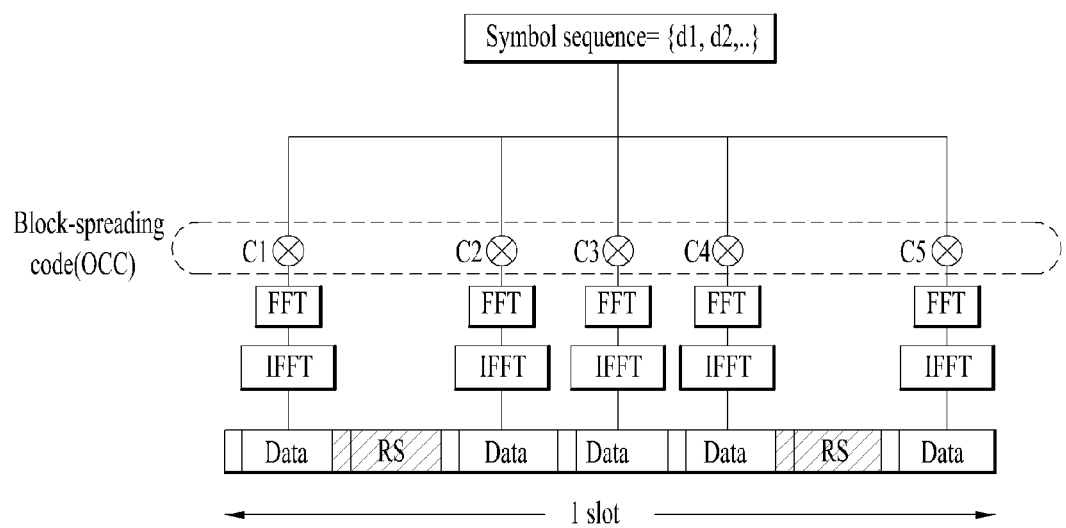
FIGS. 9 and 10 illustrate an enhanced PUCCH format (E-PUCCH format) (i.e. PUCCH format 3)

FIG. 9 illustrates a slot-level E-PUCCH format. In the E-PUCCH format, a plurality of ACKs/NACK information are transmitted through joint coding (e.g. Reed-Muller coding, Tail-biting convolutional coding, etc.), block-spreading, and SC-FDMA modulation.

Referring to FIG. 9, one symbol sequence is transmitted over a frequency domain and OCC (Orthogonal Cover Code) based time-domain spreading is applied to the symbol sequence. Control signals of multiple UEs can be multiplexed into the same RB using a OCC. Specifically, 5 SC-FDMA symbols (i.e. UCI data part) are generated from one symbol sequence {d1, d2, ... } using an OCC (C1 to C5) with length-5 (SF (Spreading Factor)=5). Here, the symbol sequence {d1, d2, ... } may mean a modulated symbol sequence or a codeword bit sequence. When the symbol sequence {d1, d2, ... } means the codeword bit sequence, the block of FIG. 9 further includes a modulation block. While FIG. 9 shows that 2 RS symbols (i.e. RS part) are used for one slot, various applications such as using an RS part composed of 3 RS symbols and an OCC with SF=4 can be considered. Here, an RS symbol can be generated from a CAZAC (Constant Amplitude Zero Autocorrelation Sequence) having a specific cyclic shift. Furthermore, an RS can be transmitted by applying (multiplying) a specific OCC to a plurality of RS symbols in the time domain.

Figure 10:
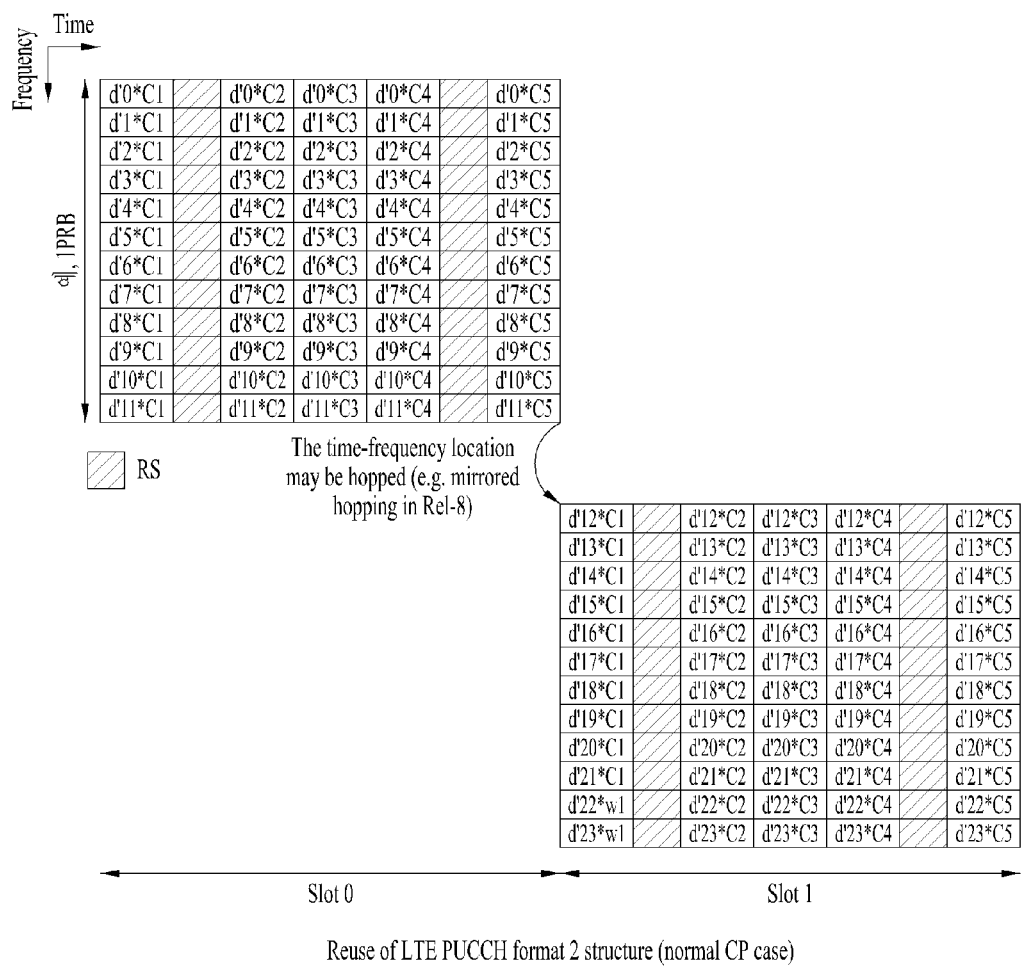

FIG. 10 illustrates a subframe-level E-PUCCH format (i.e. PUCCH format 3).

Referring to FIG. 10, a symbol sequence {d'0~d'11} is mapped to a subcarrier in one SC-FDMA symbol and mapped to 5 SC-FDMA symbols according to block-spreading using an OCC (C1 to C5) in slot 0. Similarly, a symbol sequence {d'12~d'23} is mapped to a subcarrier in one SC-FDMA symbol and mapped to 5 SC-FDMA symbols according to block-spreading using the OCC (C1 to C5) in slot 1. Here, the symbol sequence {d'0~d'11} or {d'12~d'23} as shown in each slot is obtained by applying FFT or FFT/IFFT to the symbol sequence {d1, d2, ... } of FIG. 10. When the symbol sequence {d'0~d'11} or {d'12~d'23} is a sequence obtained by applying FFT to the symbol sequence {d1, d2, ... } of FIG. 9, IFFT is additionally applied to {d'0~d'11} or {d'12~d'23} to generate SC-FDMA symbols. The entire symbol sequence {d'0~d'23} is generated by joint-coding one or more UCI, the first half {d'0~d'11} is transmitted through slot 0 and the second half {d'0~d'11} is transmitted through slot 1. The OCC may be changed on a slot basis and UCI data may be scrambled on an SC-FDMA symbol basis.

For details of the E-PUCCH format (i.e. PUCCH format 3), refer to 3GPP TS (Technical Specification) 36.211 V10.1.0 (2011. March), 36.212 V10.1.0 (2011. March) and 36.213 V10.1.0 (2011. March) published before the first priority date of the invention (2011. May 17). A description will be given of an ACK/NACK payload configuration method for PUCCH format 3 with reference to 36.213 V10.1.0 "7.3 UE procedure for reporting HARQ-ACK". An ACK/NACK payload for PUCCH format 3 is configured for each CC and then configured ACK/NACK payloads are contiguous according to the order of cell index.

Specifically, HARQ-ACK feedback bits for a c-th serving cell (or DL CC) are given as $o_{c,0}^{ACK}, o_{c,1}^{ACK}, \ldots, o_{c,O_c^{ACK}-1}^{ACK}$ ($c \geq 0$). $O_c^{ACK}$ represents the number of bits (i.e. size) of a HARQ-ACK payload for the c-th serving cell. This example corresponds to a case in which HARQ-ACK is modulated through BPSK (Binary Phase Shift Keying). When a transmission mode supporting single transport block (TB) transmission is configured or spatial HARQ-ACK bundling (for simplicity, spatial bundling) is used for the c-th serving cell, $o_c^{ACK}$ can be set as $o_c^{ACK}$=M. Here, spatial bundling means applying a logical-AND operation to a HARQ-ACK response to a DL subframe for each cell. If a transmission mode supporting transmission of multiple (e.g. 2) transport blocks is configured and spatial bundling is not used for the c-th serving cell, $o_c^{ACK}$ may be set as $o_c^{ACK}$=2M. M denotes the number of elements in a set K defined in Table 3.

When a transmission mode supporting single transport block transmission is configured or spatial bundling is used for the c-th serving cell, the position of each HARQ-ACK bit in the HARQ-ACK payload of the serving cell corresponds to $o_{c,DAI(k)-1}^{ACK}$. DAI(k) represents a DL DAI value of a PDCCH detected in DL subframe n−k. When a transmission mode supporting transmission of multiple (e.g. 2) transport blocks is configured and spatial bundling is not used for the c-th serving cell, the position of each HARQ-ACK bit in the HARQ-ACK payload of the serving cell corresponds to $o_{c,2DAI(k)-2}^{ACK}$ and $o_{c,2DAI(k)-1}^{ACK}$. The position of a HARQ-ACK bit for an SPS PDSCH corresponds to $o_{c,O_c^{ACK}-1}^{ACK}$. $o_{c,2DAI(k)-2}^{ACK}$ represents HARQ-ACK for codeword 0 and $o_{c,2DAI(k)-1}^{ACK}$ represents HARQ-ACK for codeword 1. Codewords 0 and 1 respectively correspond to transport blocks 0 and 1 or transport blocks 1 and 0 according to swapping. A HARQ-ACK bit corresponding to no detected PDSCH or no detected SPS release PDCCH is set as NACK. When PUCCH format 3 is transmitted in a subframe configured for SR transmission, HARQ-ACK bit+SR 1-bit are transmitted through PUCCH format 3.

Figure 11:
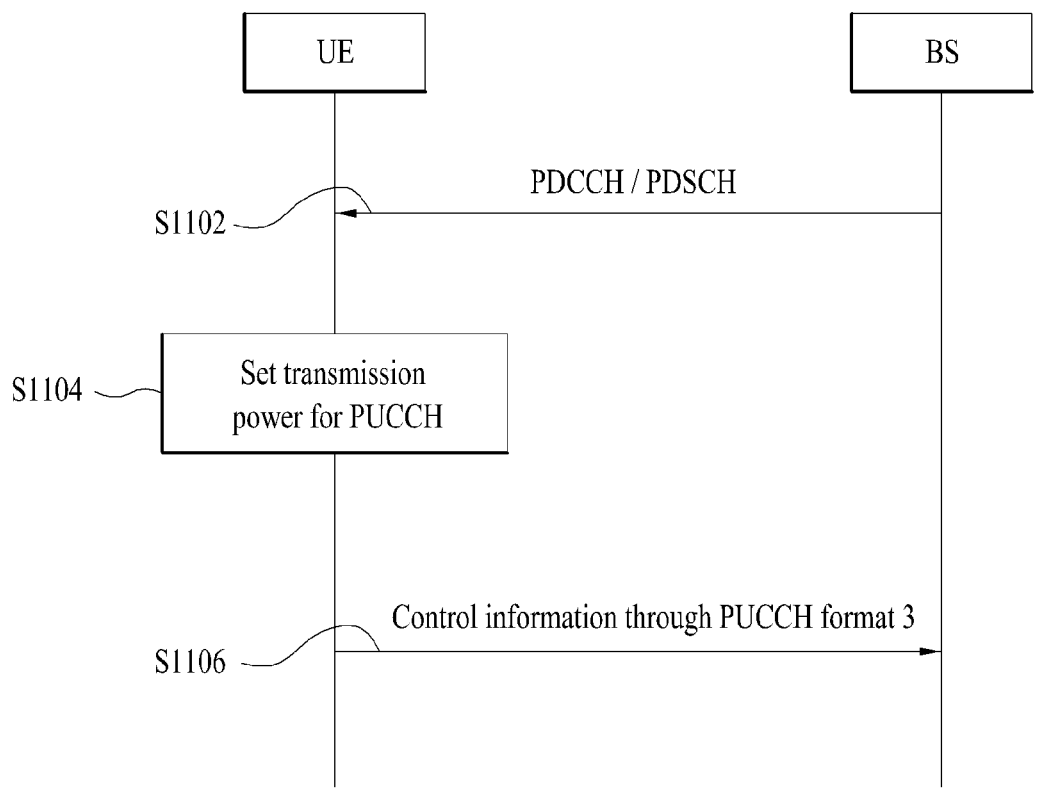
FIGS. 11 and 12 illustrate conventional PUCCH format 3 power control.

FIG. 11 illustrates a procedure for transmitting HARQ-ACK using conventional PUCCH format 3.

Referring to FIG. 11, a BS transmits one or more PDCCHs and/or one or more PDSCHs to a UE (S1102). Here, the PDCCHs include (i) PDCCH with a corresponding PDSCH, and (ii) PDCCH without a corresponding PDSCH (e.g. SPS release PDCCH). The PDSCHs include (i) PDSCH with a corresponding PDCCH (i.e. PDSCH with PDCCH), and (ii) PDSCH without a corresponding PDCCH (i.e. PDSCH without PDCCH) (e.g. SPS PDSCH). Then, the UE generates control information to be transmitted through PUCCH format 3. The control information includes HARQ-ACK information for the one or more PDCCHs and/or one or more PDSCHs, preferably, an SPS release PDCCH, PDSCH with PDCCH and PDSCH without PDSCH. When HARQ-ACK is transmitted in an SR subframe, the control information additionally includes an SR bit. The SR bit is added to the end (or the head) of a HARQ-ACK bitstream. A PUCCH format 3 signal is generated from the control information through the procedures illustrated in FIGS. 11 and 12. The UE sets PUCCH transmission power for PUCCH transmission (S1104), and the PUCCH format 3 signal is transmitted to the BS through a power control process (S1106).

A detailed description will be given of the conventional setting of PUCCH transmission power (S1104), focusing on PUCCH format 3. When a serving cell c is a primary cell, UE transmission power $P_{PUCCH(i)}$ for PUCCH transmission in a subframe i is given as follows.

[Equation 1]

$$P_{PUCCH}(i) = \min \begin{cases} P_{CMAX,c}(i), \\ P_{0\_PUCCH} + PL_c + h(\cdot) + \Delta_{F\_PUCCH}(F) + \Delta_{TxD}(F') + g(i) \end{cases} [dBm]$$

Here, $P_{CMAX,c}(i)$ denotes a maximum value of transmission power set for the serving cell c, specifically, UE transmission power defined in the subframe i for the serving cell c, more specifically, maximum UE transmission power defined in the subframe i for the serving cell c.

$P_{O\_PUCCH}$ is a parameter corresponding to the sum of $P_{O\_NOMINAL\_PUCCH}$ and $P_{O\_UE\_PUCCH}$. $P_{O\_NOMINAL\_PUCCH}$ and $P_{O\_UE\_PUCCH}$ are provided by a higher layer (e.g. RRC (Radio Resource Control) layer).

$PL_c$ denotes a downlink path loss estimate for the serving cell c. $PL_c$ is calculated by the UE and obtained by using a difference between a reference signal power provided by a higher layer and a reference signal received power (RSRP). For example, $PL_c$ may be given as referenceSignalPower— RSRP.

Parameter $\Delta_{F\_PUCCH}$ (F) is provided by a higher layer. Each value of $\Delta_{F\_PUCCH}$ (F) represents a value corresponding to a PUCCH format with respect to PUCCH format 1a. PUCCH format F is as defined in Table 2. $\Delta_{F\_PUCCH}$ (F) is 0, a negative integer or a positive integer. For example, $\Delta_{F\_PUCCH}$ (F) may be −2 dB, 0 dB or 1 dB.

When the UE is configured by a higher layer to transmit a PUCCH through a plurality of (e.g. 2) antenna ports, parameter $\Delta_{TxD}$(F') is provided by the higher layer. PUCCH format F' is as defined in Table 2. Otherwise, that is, when the UE is configured to transmit a PUCCH through a single antenna port, $\Delta_{TxD}$(F') is 0. That is, $\Delta_{TxD}$(F') corresponds to a power compensation value in consideration of an antenna port transmission mode.

h(•) is a PUCCH format dependent value. h(•) is a function having at least one of $n_{CQI}$, $n_{HARQ}$ and $n_{SR}$ as a parameter.

Since information transmitted through PUCCH format 3 is HARQ-ACK or HARQ-ACK+SR, h(•) is a function of $n_{HARQ}$ and $n_{SR}$ in case of PUCCH format 3. Specifically, $$h(\cdot) = \frac{n_{HARQ} + n_{SR} - 1}{3}$$

when the UE is configured to transmit a PUCCH signal through two antenna ports or the number of HARQ-ACK bits is greater than 11, and in other cases (i.e. single antenna port transmission)

$$h(\cdot) = \frac{n_{HARQ} + n_{SR} - 1}{2}.$$

Here, $n_{SR}$ is 0 or 1, and is used to control PUCCH power in relation to SR.

Here, $n_{HARQ}$ is used to control PUCCH power in relation to HARQ-ACK.

In case of TDD UL-DL configuration 0 (Table 1), $n_{HARQ}$ is represented as Equation 2.

$$n_{HARQ} = \sum_{c=0}^{C-1} \sum_{k \in K} N_{k,c}^{received} \quad \text{[Equation 2]}$$

Here, C denotes the number of configured (DL) cells. When spatial bundling is applied, $N_{k,c}^{received}$ represents the number of PDCCHs and/or SPS PDSCHs (i.e. PDSCH without a corresponding PDCCH) received in subframe n−k (k∈K) (refer to Table 3) and serving cell c. More generally, $N_{k,c}^{received}$ denotes the number of PDCCHs that schedule the serving cell c, received in subframe n−k (k∈K) (refer to Table 3), and/or SPS PDSCHs (i.e. PDSCH without a corresponding PDCCH) received in the serving cell c. When spatial bundling is not applied, $N_{k,c}^{received}$ denotes the number of transport block(s) and/or (downlink) SPS release PDCCHs received in subframe n−k (k∈K) (refer to Table 3) and serving cell c. $N_{k,c}^{received}$ is an integer equal to or greater than 0. Here, subframe n corresponds to subframe i in which a PUCCH signal is transmitted.

In case of TDD UL-DL configurations 1 to 6 (Table 1), $n_{HARQ}$ is represented as Equation 3.

$$n_{HARQ} = \sum_{c=0}^{C-1} \left( (V_{DAI,c}^{DL} - U_{DAI,c}) \cdot n_c^{ACK} + \sum_{k \in K} N_{k,c}^{received} \right) \quad \text{[Equation 3]}$$

Here, C, c and $N_{k,c}^{received}$ are as defined in Equation 2.

$V_{DAI,c}^{DL}$ denotes a DL DAI value included in PDCCH lastly received by the UE from among PDCCHs that schedule the serving cell c. In other words, $V_{DAI,c}^{DL}$ denotes a DL DAI value included in PDCCH lastly received by the UE from among PDCCHs for the serving cell c. Equivalently (refer to 36.213 V10.1.0 (2011. March) "7.3 UE procedure for reporting HARQ-ACK"), $V_{DAI,c}^{DL}$ represents a DL DAI value included in a PDCCH detected by the UE in subframe n−$k_m$ and the serving cell c. Here, $k_m$ is a minimum value of k corresponding to a detected PDCCH in set K (k∈K) (refer to Table 3). Here, the PDCCH includes a PDCCH for DL scheduling, for example, a PDCCH having DCI format 1/1A/1B/1D/2/2A/2B/2C. When no transport block and no SPS release PDCCH are detected in subframe n−k (k∈K) (refer to Table 3) and the serving cell c, $V_{DAI,c}^{DL}$=0.

Here, $U_{DAI,c}$ denotes the number of PDCCHs that schedule the serving cell c, received by the UE. In other words, $U_{DAI,c}$ represents the number of PDCCHs for the serving cell c, received by the UE. Equivalently (refer to 36.213 V10.1.0 (2011. March) "7.3 UE procedure for reporting HARQ-ACK"), $U_{DAI,c}$ denotes the total number of PDCCHs detected by the UE in subframe n−k (k∈K) (refer to Table 3) and the serving cell c. Here, the PDCCHs include PDCCH with PDSCH and SPS release PDCCH.

Here, $n_c^{ACK}$ denotes the number of HARQ-ACK bits corresponding to a configured DL transmission mode on the serving cell c. When spatial bundling is applied, $n_c^{ACK}$=1. On the other hand, when a transmission mode supporting transmission of multiple (e.g. 2) transport blocks is configured and spatial bundling is not applied, $n_c^{ACK}$=2.

In addition, g(i) denotes a current PUCCH power control adjustment state. Specifically, $$g(i) = g(i-1) + \sum_{m=0}^{M-1} \delta_{PUCCH}(i - k_m).$$

g(0) is the first value after reset. $\delta_{PUCCH}$ is a UE-specific correction value and may be called a TPC command. In case of PCell, $\delta_{PUCCH}$ is included in a PDCCH having DCI format 1A/1B/1D/1/2A/2/2B/2C. Furthermore, $\delta_{PUCCH}$ is joint-coded with a different UE-specific PUCCH correction value on a PDCCH having DCI format 3/3A.

Figure 12:
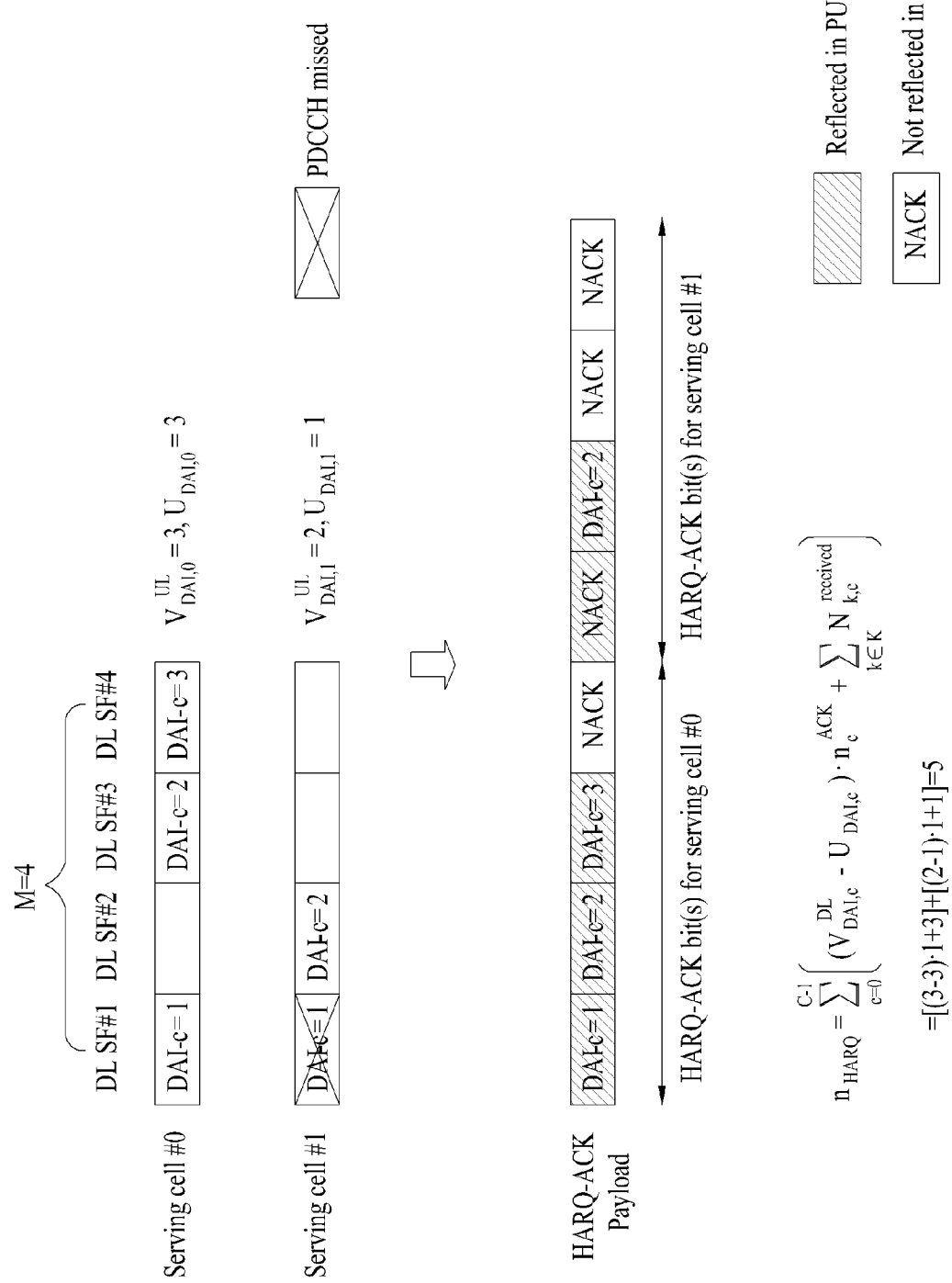

FIG. 12 illustrates a HARQ-ACK payload configuration and PUCCH format 3 power control according thereto. For convenience, FIG. 12 illustrates a case in which two serving cells (serving cells #0 and #1) are configured for a UE and M=4 (e.g. UL-DL configurations #2 and #4). It is assumed that each serving cell is configured to a transmission mode for supporting single transport block transmission or configured such that spatial bundling is applied. In the figure, DL SF indexes logically represent the order of M DL SFs. Actual DL SF indexes may be different from these DL SF indexes. FIG. 12 can correspond to both non-cross-CC scheduling and cross-CC scheduling.

Referring to FIG. 12, the BS transmits 3 PDCCHs in serving cell #3 to the UE. DAI-c=1, DAI-c=2 and DAI-c=3 are respectively included in the 3 PDCCHs. The BS transmits 2 PDCCHs in serving cell #1 to the UE, and DAI-c=1 and DAI-c=2 are respectively included in the 2 PDCCHs. In this case, it is assumed that the UE has detected all 3 PDCCHs in serving cell #0 (i.e. $V_{DAI,0}^{DL}=3$, $U_{DAI,0}=3$) and has detected only the second PDCCH in serving cell #1 (i.e. $V_{DAI,1}^{DL}=2$, $U_{DAI,1}=1$). As described above with reference to FIGS. 9 and 10, when PUCCH format 3 is configured, the number of HARQ-ACK bits for each serving cell is determined by a value of M according to a UL-DL configuration, a transmission mode, and whether spatial bundling is applied, and whether actual PDCCH and/or PDSCH transmission has been performed in the corresponding DL subframe is not considered. In this example, since M=4 and spatial bundling is applied, the UE generates O-bit HARQ-ACKs for each cell and concatenates the HARQ-ACKs in the order of cell indexes.

When a PUCCH transmission power is set, all bits in a HARQ-ACK payload are not reflected into the PUCCH transmission power. Only a HARQ-ACK bit(s) having valid information in the HARQ-ACK payload is reflected into the PUCCH transmission power through $n_{HARQ}$. That is, a HARQ-ACK bit included in the HARQ-ACK payload to simply maintain a HARQ-ACK payload size is not reflected into the PUCCH transmission power. If no PDSCH without PDCCH (e.g. SPS PDSCH) is received, $N_{k,c}^{received}=U_{DAI,c}$ and $n_{HARQ}$ is 5 according to Equation 3. That is, only power corresponding to 5 HARQ-ACK bits from among a total of 8 HARQ-ACK bits is reflected into the PUCCH transmission power.

A description will be given of a problem in the conventional power control method for PUCCH format 3. The conventional Equation 3 is used to determine $n_{HARQ}$ on the basis of the number of transport blocks (TBs) (or PDCCHs) scheduled for the UE for each serving cell and to perform final PUCCH power control by applying $n_{HARQ}$. Specifically, according to Equation 3, the number of PDCCHs that have not been detected by the UE (the UE can determine that the PDCCHs have not been detected although the UE has not received the PDCCHs) is multiplied by $n_c^{ACK}$ (a maximum number of TBs that can be transmitted through serving cell c in a DL subframe when spatial bundling is not applied) and is summed with the number of TBs (or PDCCHs) actually received by the UE for each serving cell to calculate the number of TBs (or PDCCHs) scheduled for each serving cell, and the sum of the numbers of TBs for all serving cells is determined as final $n_{HARQ}$. More specifically, $(V_{DAI,c}^{DL}-U_{DAI,c})$ in Equation 3 is used to reflect DTX (i.e., PDCCH missed) detected by the UE in serving cell c into PUCCH power. For example, $V_{DAI,1}^{DL}=2$ and $U_{DAI,1}=1$ in FIG. 12, the UE may recognize $1(=V_{DAI,c}^{DL}-U_{DAI,c})$ DTX in serving cell #1 and reflect DTX into PUCCH power.

However, while modulo-4 operation is applied to DAI-c (i.e. $V_{DAI}^{DL}$) as follows, since $U_{DAI}$ represents the number of actually received PDCCHs, $n_{HARQ}$ may not be exactly calculated using the conventional Equation 3 when M>4 (e.g. M=9) (e.g. UL-DL configuration #5 of Table 1).

Considering a TDD configuration (e.g. UL-DL configuration 5 of Table 1) in which DL SF:UL SF=9:1, the following modulo-4 operation is applied to 2-bit DAI-c.

DAI-c of the first, fifth or ninth scheduled PDSCH or DL grant PDCCH equals 1.

DAI-c of the second or sixth scheduled PDSCH or DL grant PDCCH equals 2.

DAI-c of the third or seventh scheduled PDSCH or DL grant PDCCH equals 3.

DAI-c of the fourth or eighth scheduled PDSCH or DL grant PDCCH equals 4.

Figure 13:
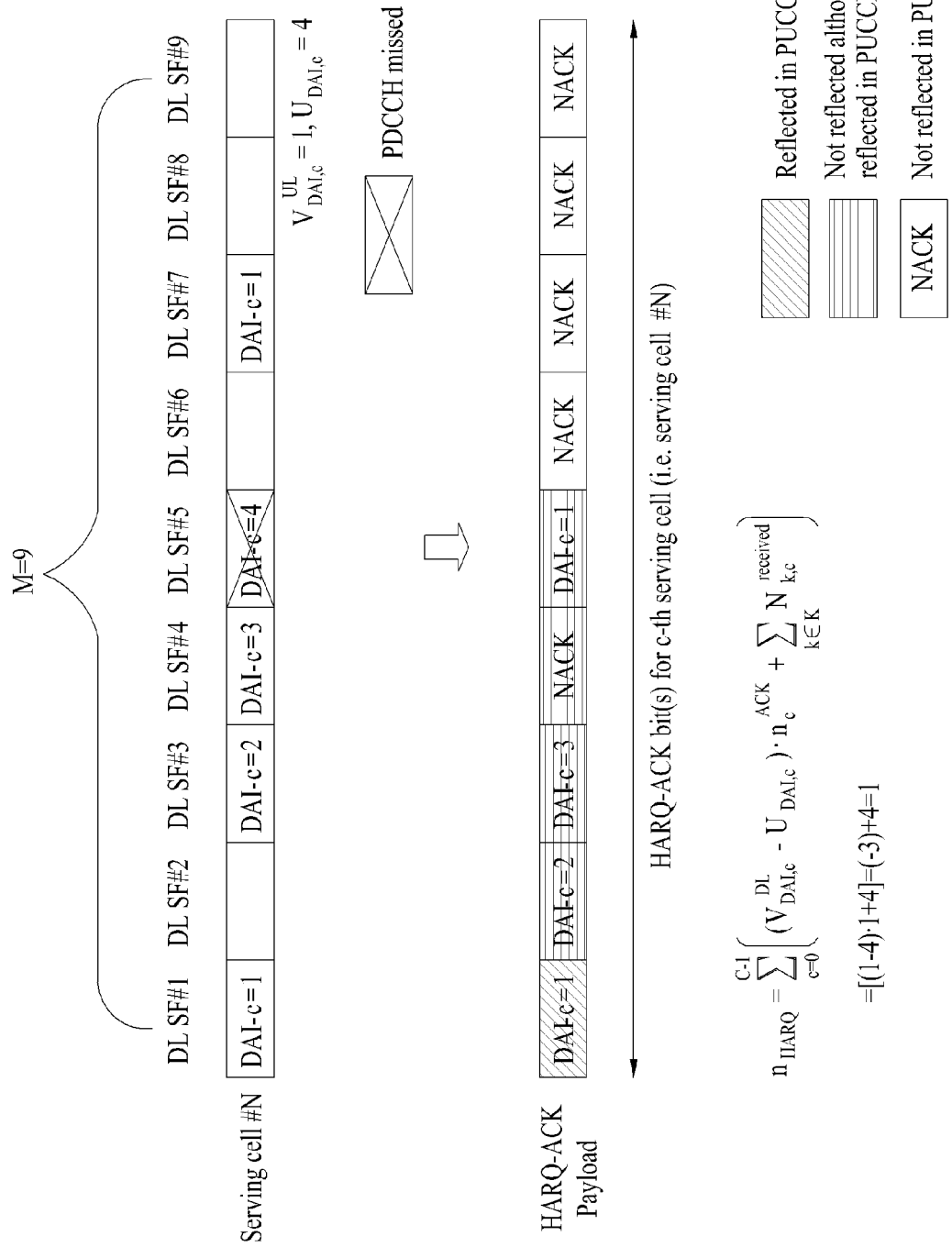
FIG. 13 illustrates a problem in the conventional PUCCH format 3 power control.

FIG. 13 illustrates a problem in the above-described conventional power control method for PUCCH format 3. This example assumes that one cell is configured for a UE. The method illustrated in FIG. 12 may be applied to a case in which a plurality of cells are configured for the UE. In this example, M=9 (e.g. UL-DL configuration #5). This example is based on the assumption that a serving cell is configured to a transmission mode supporting single transport block transmission or configured such that spatial bundling is applied. In FIG. 13, DL SF indexes represent the logical order of M DL SFs. Actual DL SF indexes may differ from these DL SF indexes.

Referring to FIG. 13, it can be assumed that the BS transmits 5 PDCCHs (i.e. DAI-c=1, 2, 3, 4, 1) that schedule serving cell c and the UE receives only 4 PDCCHs (i.e. $U_{DAI,c}=4$) including the last PDCCH (i.e. $V_{DAI,c}^{DL}=1$). In this case, because the number of PDCCH that failed to be detected is 1, $n_{HARQ}$ should be 5 if no SPS PDSCH has been received. However, according to Equation 3, $n_{HARQ}$ is 1 because $(V_{DAI,c}^{DL}-U_{DAI,c})=-3$. Accordingly, power for 4 HARQ-ACK bits is not reflected into the PUCCH transmission power, and thus a probability of HARQ-ACK decoding error increases in the BS.

To solve the above problem, the present invention proposes a method for determining a power control parameter $n_{HARQ}$, which can be applied when M>4. The proposed method described below may be generally used when M≤4.

Figure 14:
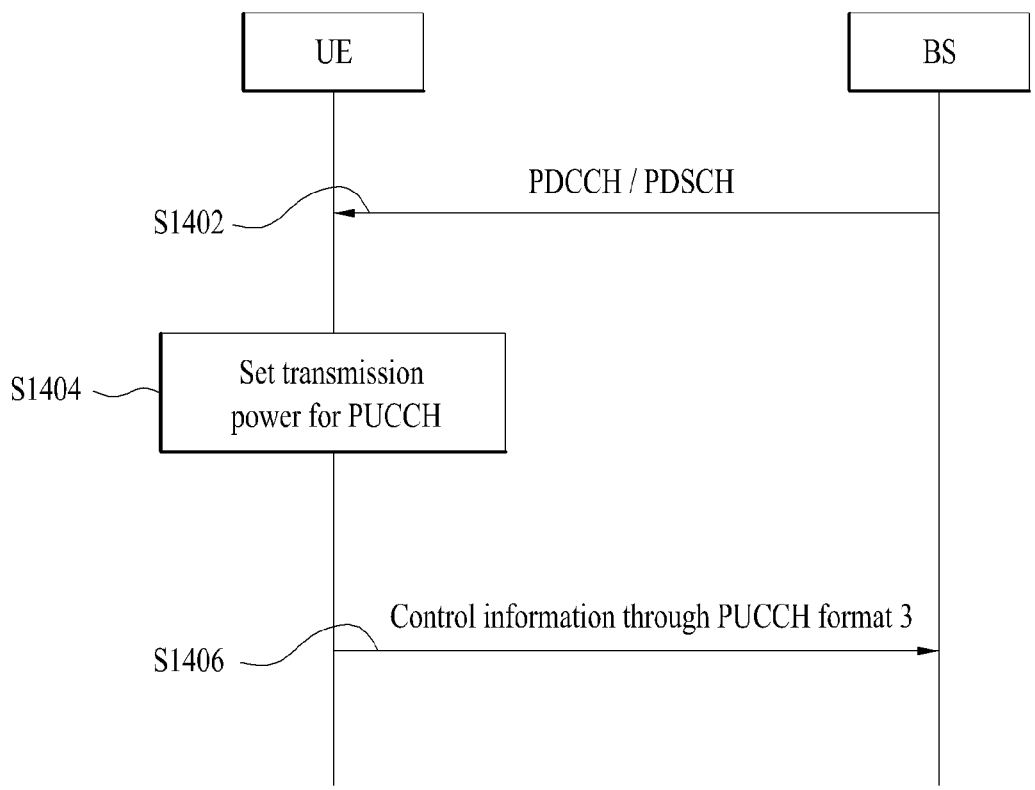
FIGS. 14 and 15 illustrate PUCCH format 3 power control according to an embodiment of the present invention.

FIG. 14 illustrates a procedure for transmitting PUCCH format 3 according to an embodiment of the present invention.

Referring to FIG. 14, a BS transmits one or more PDCCHs and/or one or more PDSCHs to a UE (S1402). Here, the PDCCHs include (i) PDCCH with a corresponding PDSCH, and (ii) PDCCH without a corresponding PDSCH (e.g. SPS release PDCCH). The PDSCHs include (i) PDSCH with a corresponding PDCCH (i.e. PDSCH with PDCCH), and (ii) PDSCH without a corresponding PDCCH (i.e. PDSCH without PDCCH) (e.g. SPS PDSCH). Then, the UE generate control information to be transmitted through PUCCH format 3. The control information includes HARQ-ACK information for the one or more PDCCHs and/or one or more PDSCHs, preferably, an SPS release PDCCH, PDSCH with PDCCH and PDSCH without PDSCH. When HARQ-ACK is transmitted in an SR subframe, the control information additionally includes an SR bit. The SR bit is added to the end (or the head) of a HARQ-ACK bitstream. A PUCCH format 3 signal is generated from the control information through the procedures illustrated in FIGS. 11 and 12. The UE sets a PUCCH transmission power for PUCCH transmission (S1404), and the PUCCH format 3 signal is transmitted to the BS through a power control process (S1406).

The setting of PUCCH transmission power (S1404) is performed by using Equation 1. That is, when serving cell c is a primary cell, UE transmission power $P_{PUCCH}(i)$ for PUCCH transmission in a subframe i is provided as follows.

$$P_{PUCCH}(i) = \min\begin{cases} P_{CMAX,c}(i), \\ P_{0\_PUCCH} + PL_c + h(\cdot) + \Delta_{F\_PUCCH}(F) + \Delta_{T \times D}(F') + g(i) \end{cases} [dBm]$$

Here, $P_{CMAX,c}(i)$, $P_{O\_PUCCH}$, $PL_c$, $\Delta_{F\_PUCCH}(F)$, $\Delta_{TxD}(F')$ and $g(i)$ are as described with regard to Equation. 1. $h(\cdot)$ is given as $$h(\cdot) = \frac{n_{HARQ} + n_{SR} - 1}{3} \text{ or } h(\cdot) = \frac{n_{HARQ} + n_{SR} - 1}{2}$$

as described above with reference to Equation 1.

Here, $n_{HARQ}$ can be given according to Equation 4 proposed by the present invention.

$$n_{HARQ} = \sum_{c=0}^{C-1} \left( ((V_{DAI,c}^{DL} - U_{DAI,c}) \bmod 4) \cdot n_c^{ACK} + \sum_{k \in K} N_{k,c}^{received} \right) \quad [\text{Equation 4}]$$

Here, C, c, $V_{DAI,c}^{DL}$, $U_{DAI,c}$, $n_c^{ACK}$ and $N_{k,c}^{received}$ are as defined in Equations 2 and 3. In Equation 4, mod represents a modulo operation. Specifically, A mod B represents a remainder when A is divided by B. Both A and B are integers. A result of A mod B is as follows.

TABLE 5

| | | | | A | | | | |
|---|---|---|---|---|---|---|---|---|
| −4 | −3 | −2 | −1 | 0 | 1 | 2 | 3 | 4 |
| A mod 4 | | | | | | | | |
| 0 | 1 | 2 | 3 | 0 | 1 | 2 | 3 | 0 |

According to the conventional Equation 3, the number of PDCCHs (or corresponding PDSCHs) from which DTX is detected is not correctly reflected into PUCCH power control when $(V_{DAI,c}^{DL} - U_{DAI,c})$ is a negative number. According to the proposed method, however, the number of PDCCHs from which DTX is detected is correctly calculated by modulo-4 operation even when $(V_{DAI,c}^{DL} - U_{DAI,c})$ is a negative number, and thus the correct number of HARQ-ACK bits can be reflected into PUCCH power control. For example, assuming that $U_{DAI,c}=5$, $V_{DAI,c}^{DL}$ may be 2 (i.e. 6 PDCCHs) and 3 (i.e. 7 PDCCHs) when the number of PDCCHs that failed to be detected in a corresponding serving cell is 1 and 2, respectively. In this case, while $(V_{DAI,c}^{DL} - U_{DAI,c})$ is −3 and −2, 1 and 2 are used for PUCCH power control according to modulo-4 operation.

Equivalently to Equation 4, $n_{HARQ}$ may be provided according to Equation 5 proposed by the present invention.

$$n_{HARQ} = \sum_{c=0}^{C-1} \left( (V_{DAI,mod4,c}^{DL} - U_{DAI,c}) \cdot n_c^{ACK} + \sum_{k \in K} N_{k,c}^{received} \right) \quad [\text{Equation 5}]$$

Here, C, c, $U_{DAI,c}$, $n_c^{ACK}$ and $N_{k,c}^{received}$ are as defined in Equations 2 and 3. $V_{DAI-mod4,c}^{DL}$ is a parameter considering modulo-4 operation. For example, $V_{DAI-mod4,c}^{DL}$ is equal to $U_{DAI,c}$ or a smallest value of $(4k+V_{DAI,c}^{DL})$ (k is an integer equal to or greater than 0) from among numbers greater than $U_{DAI,c}$.

Even in case of Equations 4 and 5, an error may occur when the number of PDCCHs that failed to be detected in the serving cell is 4 or more. However, a probability that the error occurs is very low, and thus stable and efficient power control can be performed according to the proposed method.

Figure 15:
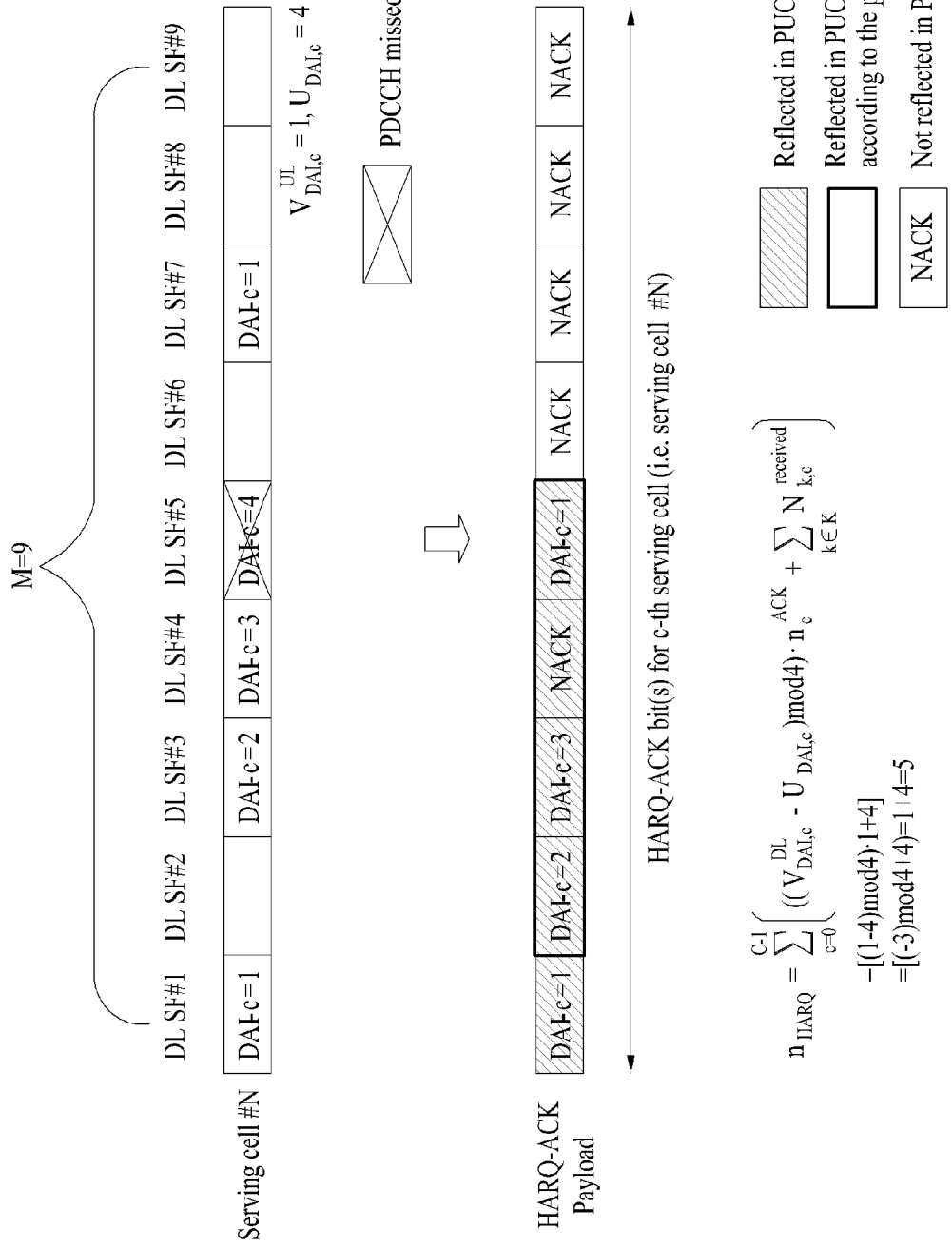

FIG. 15 illustrates power control for PUCCH format 3 according to an embodiment of the present invention. The present embodiment is based on the assumption that one cell is configured for a UE. The method illustrated in FIG. 12 may be applied to a case in which a plurality of cells are configured for the UE. The present embodiment shows a case in which M=9 (e.g. UL-DL configuration #5) according to UL-DL configuration. The present embodiment is based on the assumption that a serving cell is configured to a transmission mode supporting single transport block transmission or configured such that spatial bundling is applied. In FIG. 13, DL SF indexes represent the logical order of M DL SFs. Actual DL SF indexes may differ from these DL SF indexes.

Referring to FIG. 15, it may be assumed that the BS transmits 5 PDCCHs (i.e. DAI-c=1, 2, 3, 4, 1) that schedule serving cell c and the UE receives only 4 PDCCHs (i.e. $U_{DAI,c}=4$) including the last PDCCH (i.e. $V_{DAI,c}^{DL}=1$). In this case, if no SPS PDSCH is received, $n_{HARQ}$ should be 5. However, $n_{HARQ}$ is 1 according to the conventional method (refer to FIG. 13). However, according to the proposed method, $n_{HARQ}$ is correctly set as 5. The proposed method may be generally used for UL-DL configurations in which M>4 as well as UL-DL configurations in which M≤4.

A case in which $N_{k,c}^{received}$, $V_{DAI,c}^{DL}$ and $U_{DAI,c}$ are obtained based on PDCCHs received in the serving cell c has been described above. This is for convenience of description and corresponds to non-cross CC scheduling. Considering cross-CC scheduling, $N_{k,c}^{received}$, $V_{DAI,c}^{DL}$ and $U_{DAI,c}$ are obtained based on PDCCHs that schedules the serving cell c. In this case, the PDCCHs for the serving cell c are received through a PCell or a cell configured for PDCCH monitoring.

Figure 16:
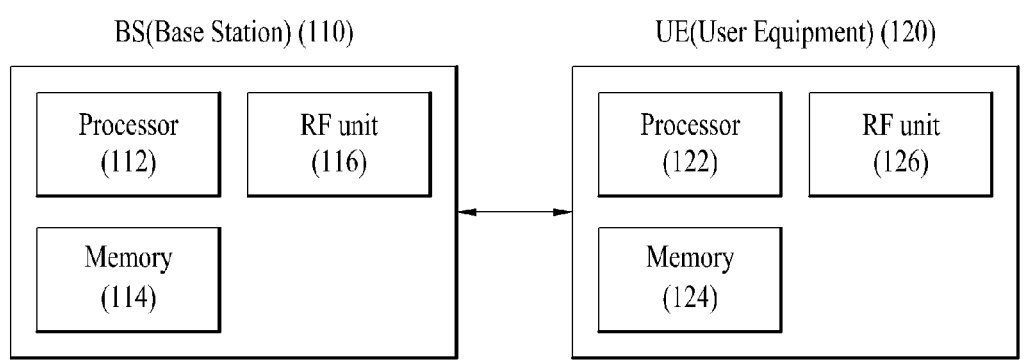
FIG. 16 illustrates a base station (BS) and a user equipment (UE) applicable to an embodiment of the present invention.

FIG. 16 illustrates a base station (BS) and a user equipment (UE) applicable to an embodiment of the present invention.

Referring to FIG. 16, an RF communication system includes a base station (BS) 110 and a user equipment (UE) 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives radio signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives radio signals. The BS 110 and the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly recited in each other in the appended claims may be presented in combination as an embodiment of the present invention or included as a new claim by subsequent amendment after the application is filed.

In the embodiments of the present invention, a description is given, focusing on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting uplink control information by a user equipment in a TDD (Time Division Duplex) wireless communication system, the method comprising:

determining, by the user equipment, a PUCCH (Physical Uplink Control Channel) transmission power parameter $n_{HARQ}$ according to an UL-DL (Uplink-Downlink) configuration and the following equation:

$$n_{HARQ} = \sum_{c=0}^{C-1} \left( ((V_{DAI,c}^{DL} - U_{DAI,c}) \bmod 4) \cdot n_c^{ACK} + \sum_{k \in K} N_{k,c}^{received} \right),$$

wherein C denotes a number of configured cells,
K denotes a set having M elements k (k∈K) according to the UL-DL configuration, M is a positive integer, $V_{DAI,c}^{DL}$ is a value indicated by a 2-bit DAI (Downlink Assignment Index) field included in a downlink scheduling-related PDCCH (Physical Downlink Control Channel) lastly detected within subframe(s) n−k in a serving cell c, $U_{DAI,c}$ denotes a total number of downlink scheduling-related PDCCHs detected within the subframe(s) n−k in the serving cell c, $n_c^{ACK}$ denotes a number of HARQ-ACK bits corresponding to a configured downlink transmission mode on the serving cell c, and is set to 1 when spatial bundling is applied, when spatial bundling is applied, $N_{k,c}^{received}$ represents a number of PDCCH or PDSCH (Physical Downlink Shared Channel) without a corresponding PDCCH received in the subframe(s) n−k and the serving cell c, when spatial bundling is not applied, $N_{k,c}^{received}$ represents a number of transport blocks received or SPS (Semi-Persistent Scheduling) release PDCCH received in the subframe(s) n−k and the serving cell c, and mod represents a modulo operation; and transmitting, by the user equipment, a HARQ-ACK (Hybrid Automatic Repeat reQuest-Acknowledgement) signal via a PUCCH in a subframe n in accordance with the determined PUCCH transmission power parameter.

2. The method according to claim 1, wherein a transmission power for the PUCCH is determined according to the following equation:

$$h(\cdot) = \frac{n_{HARQ} + n_{SR} - 1}{N},$$

wherein N is a positive integer, and
$n_{SR}$ is a power adjustment parameter used to adjust the transmission power for the PUCCH in relation to SR (Scheduling Request), and is set to 0 or 1.

3. The method according to claim 2, wherein the transmission power for the PUCCH is determined according to the following equation:

$$P_{PUCCH}(n) = \min \begin{cases} P_{CMAX,c}(n), \\ P_{0\_PUCCH} + PL_c + h(\cdot) + \Delta_{F\_PUCCH}(F) + \Delta_{TxD}(F') + g(i) \end{cases},$$

wherein $P_{PUCCH}(n)$ represents the transmission power for the PUCCH, $P_{CMAX,c}(n)$ represents a configured transmission power in the subframe n for the serving cell c, $P_{0\_PUCCH}$ is determined based on at least one parameter provided by a higher layer, $PL_c$ is a downlink path loss estimate of the serving cell c, $\Delta_{F\_PUCCH}(F)$ represents a value corresponding to a PUCCH format, $\Delta_{TxD}(F)$ is a value provided by the higher layer or 0, and g(i) represents a current PUCCH power control adjustment state.

4. The method according to claim 1, wherein the UL-DL configuration is one of UL-DL configurations #1 to #6 as shown in the following table

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a subframe comprising a downlink period, a guard period, and an uplink period, and U denotes an uplink subframe.

5. The method according to claim 4, wherein the UL-DL configuration is UL-DL configuration #5.

6. A communication device configured to transmit uplink control information in a TDD (Time Division Duplex) wireless communication system, the communication device comprising:
a processor,
wherein the processor is configured to:
determine a PUCCH (Physical Uplink Control Channel) transmission power parameter $n_{HARQ}$ according to an UL-DL (Uplink-Downlink) configuration and the following equation:

$$n_{HARQ} = \sum_{c=0}^{C-1}\left(((V_{DAI,c}^{DL} - U_{DAI,c}) \bmod 4) \cdot n_c^{ACK} + \sum_{k \in K} N_{k,c}^{received}\right),$$

wherein C denotes a number of configured cells,
K denotes a set having M elements k (k∈K) according to the UL-DL configuration, M is a positive integer,
$V_{DAI,c}^{DL}$ is a value indicated by a 2-bit DAI (Downlink Assignment Index) field included in a downlink scheduling-related PDCCH lastly detected within subframe(s) u−k in a serving cell c,
$U_{DAI,c}$ denotes a total number of downlink scheduling-related PDCCHs detected within the subframe(s) n-k in the serving cell c,
$n_c^{ACK}$ denotes a number of HARQ-ACK bits corresponding to a configured downlink transmission mode on the serving cell c, and is set to 1 when spatial bundling is applied,
wherein when spatial bundling is applied, $N_{k,c}^{received}$ represents a number of PDCCH or PDSCH without a corresponding PDCCH received in the subframe(s) n−k and the serving cell c,
wherein when spatial bundling is not applied, $N_{k,c}^{received}$ represents a number of transport blocks or SPS (Semi-Persistent Scheduling) release PDCCH received in the subframe(s) n−k and the serving cell c, and
wherein mod represents a modulo operation; and
a radio frequency (RF) unit coupled to the processor, wherein the RF unit is configured to transmit a HARQ-ACK (Hybrid Automatic Repeat reQuest-Acknowledgement) signal via a PUCCH (Physical Uplink Control Channel) in a subframe n in accordance with the determined PUCCH transmission power parameter.

7. The communication device according to claim 6, wherein a transmission power for the PUCCH is determined according to the following equation:

$$h(\cdot) = \frac{n_{HARQ} + n_{SR} - 1}{N},$$

wherein N is a positive integer, and
$n_{SR}$ is a power adjustment parameter used to adjust the transmission power for the PUCCH in relation to SR, and is set to 0 or 1.

8. The communication device according to claim 7, wherein the transmission power for the PUCCH is determined according to the following equation:

$$P_{PUCCH}(n) = \min\left\{\begin{array}{l} P_{CMAX,c}(n), \\ P_{0\_PUCCH} + PL_c + h(\cdot) + \Delta_{F\_PUCCH}(F) + \Delta_{TxD}(F') + g(i) \end{array}\right\},$$

wherein $P_{PUCCH}(n)$ represents the transmission power for the PUCCH,
$P_{CMAX,c}(n)$ represents a configured transmission power in the subframe n for the serving cell c,
$P_{0\_PUCCH}$ is determined based on at least one parameter provided by a higher layer,
$PL_c$ is a downlink path loss estimate of the serving cell c,
$\Delta_{F\_PUCCH}(F)$ represents a value corresponding to a PUCCH format,
$\Delta_{TxD}(F')$ is a value provided by the higher layer or 0, and
g(i) represents a current PUCCH power control adjustment state.

9. The communication device according to claim 6, wherein the UL-DL configuration is one of UL-DL configurations #1 to #6 as shown in the following table

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a subframe comprising a downlink period, a guard period, and an uplink period, and U denotes an uplink subframe.

10. The communication device according to claim 9, wherein the UL-DL configuration is UL-DL configuration #5.

* * * * *